United States Patent [19]
Peterson et al.

[11] 4,283,986
[45] Aug. 18, 1981

[54] SELF-PENETRATING WALLBOARD ANCHOR

[75] Inventors: Francis C. Peterson, St. Charles; Gerald D. Barth, South Elgin; Rodney O. Slotten, Batavia, all of Ill.

[73] Assignee: Illinois Tool Works Inc., Chicago, Ill.

[21] Appl. No.: 78,864

[22] Filed: Sep. 26, 1979

[51] Int. Cl.³ ............................................. F16B 21/00
[52] U.S. Cl. ................................ 411/340; 411/341; 411/346
[58] Field of Search ............... 85/3 R, 3 S, 3 K, 1 P, 85/68; 24/211 P, 211 R; 248/71

[56] References Cited
U.S. PATENT DOCUMENTS

| 867,799 | 10/1907 | Cook | 85/3 R |
|---|---|---|---|
| 1,738,133 | 12/1929 | Anderson | 85/3 R |
| 2,439,364 | 4/1948 | King et al. | 85/3 R |
| 2,519,511 | 8/1950 | Stelter | 85/3 R |
| 2,532,040 | 11/1950 | Seely | 85/3 R |
| 2,919,089 | 12/1959 | Durham | 248/71 |
| 3,605,547 | 9/1971 | Millet | 85/3 S |
| 3,782,238 | 1/1974 | Polos | 85/3 R |
| 3,927,597 | 12/1975 | Stults et al. | 85/3 R |
| 4,043,245 | 8/1977 | Kaplan | 85/3 R |
| 4,196,883 | 4/1980 | Einhorn | 85/3 R X |

FOREIGN PATENT DOCUMENTS 577002  5/1933  Fed. Rep. of Germany ............ 85/3 R Primary Examiner—Ramon S. Britts
Attorney, Agent, or Firm—Richard K. Thomson; Thomas W. Buckman

[57] ABSTRACT

A self-penetrating fastener assembly for anchoring in wallboard has a pointed anchor member and a threaded fastener. The anchor member has a longitudinal recess formed by semicylindrical segments which intersects an aperture that extends through the anchor. The fastener is aligned within the recess which engages the threads of the fastener, the head thereof protruding beyond the end of the anchor and the assembly is hammered into the wallboard. When the anchor clears the wallboard, the fastener is threadingly advanced into the anchor which, in turn, is drawn up against the back of the wallboard securely attaching an article thereto.

10 Claims, 10 Drawing Figures

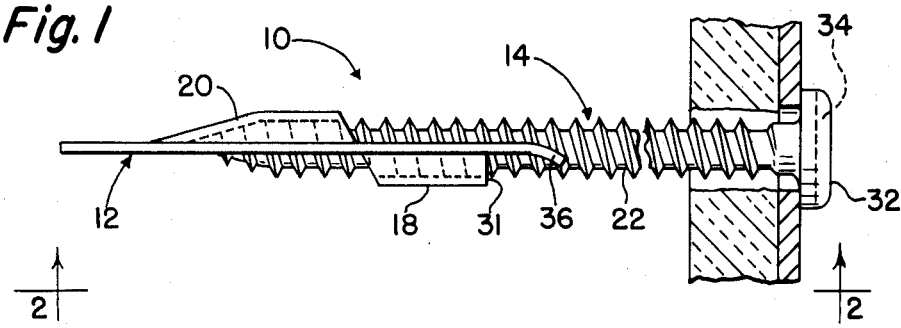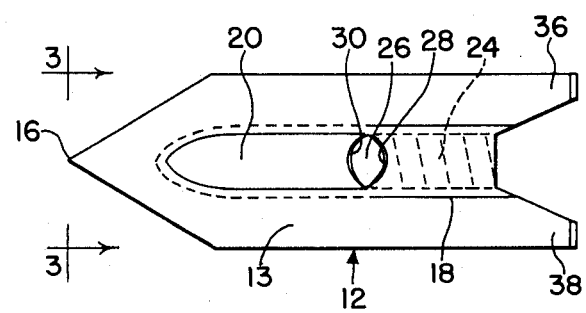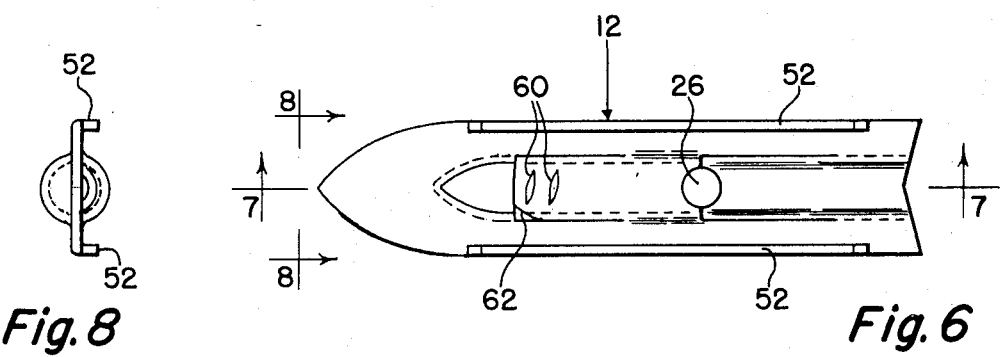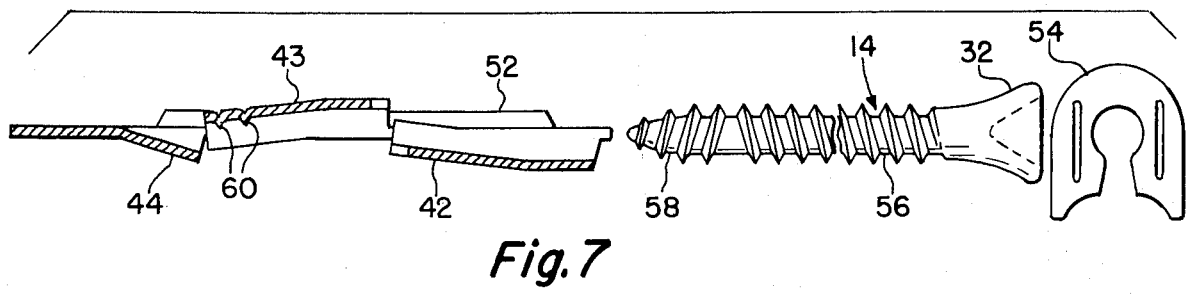

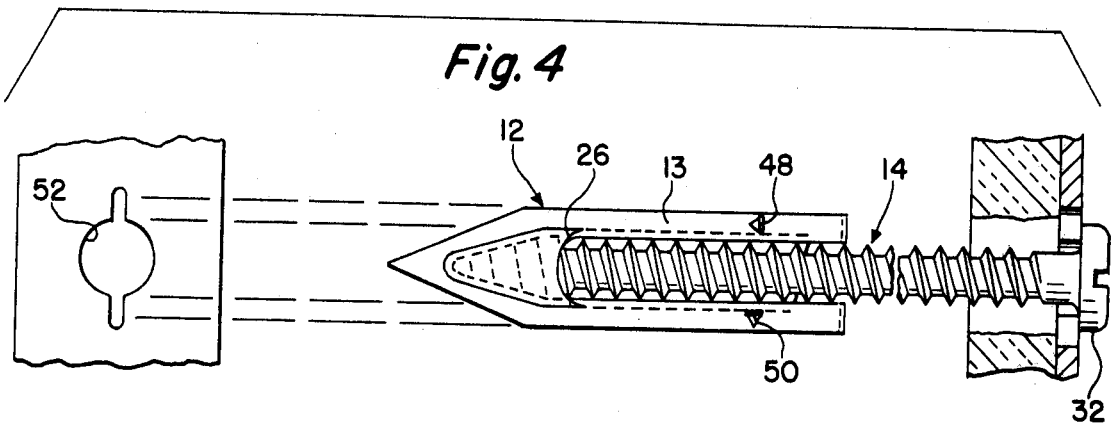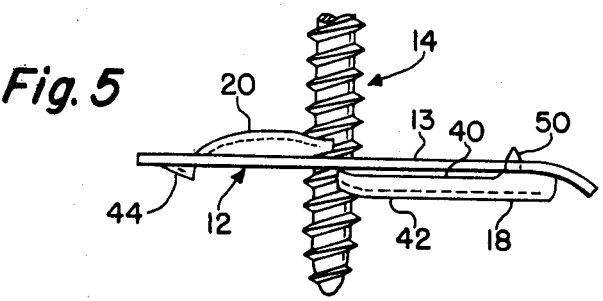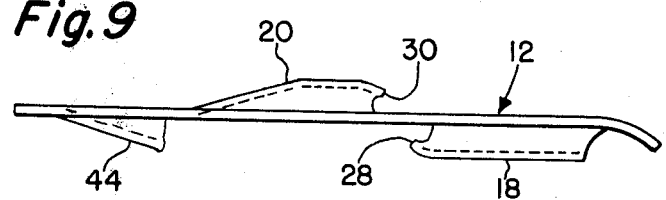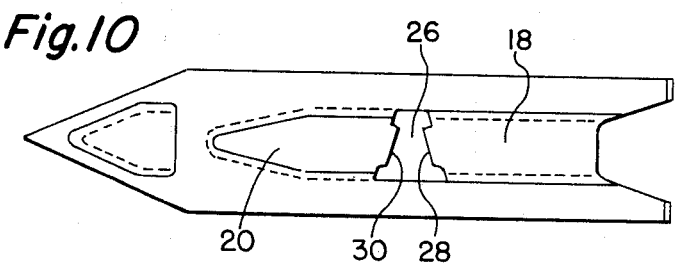

SELF-PENETRATING WALLBOARD ANCHOR

BACKGROUND AND SUMMARY OF THE INVENTION

A number of anchors have been devised for anchoring articles in wallboard, such as dry wall, for example. These prior art anchors include toggle bolts and self-expanding anchors. The primary problem with such anchors is that they all require a predrilled hole.

It is a primary object of this invention, therefore, to provide an anchor suitable for use in wallboard which can create its own entry hole.

It is a further object of the present invention to provide an anchor that is simple in design, easy to manufacture, and easily installed.

These and other objects of the invention are achieved by a fastener assembly comprised of a self-penetrating anchor member having generally the shape of an arrowhead. The anchor has a plate-like structure with a pair of semi-cylindrical segments formed along its axis on opposite sides of the plane of the plate-like structure. These semi-cylindrical segments form a longitudinal recess which receives a portion of the fastener. With the axis of the anchor and fastener in alignment, the assembly can be pushed or hammered into the wallboard. Once the anchor member has cleared the wallboard, means provided on the anchor cause it to rotate to a position across the fastener axis, the fastener being threadingly engaged by an aperture extending through the plate between the semi-cylindrical segments. The fastener can now be drawn down to secure a mounting bracket, or the like, to the wallboard.

The means for causing rotation may constitute a pair of camming ears which engage the backside of the wallboard or, in alternative embodiments, one or more spring fingers formed as part of one of both of the semi-cylindrical segments which finger(s) push against the shank of the fastener. The anchor member may include means to embed into the wallboard so that the fastener can be removed and replaced.

These and other advantages, objects and features of the present invention will be better understood by referring to the following detailed description taken in conjunction with the accompanying drawings.

BRIEF DESCRIPTION OF THE DRAWINGS

FIG. 1 is a side elevation of one embodiment of the fastener assembly of the present invention;

FIG. 2 is a bottom view of the fastener assembly of the present invention taken along line 2—2 of FIG. 1 with the fastener removed in order to show greater detail of the anchor member;

FIG. 3 is an end view of the anchor member taken along line 3—3 of FIG. 2;

FIG. 4 is a plan view of a second embodiment of the fastener assembly of the present invention which also shows the shape of the aperture in the bracket with which the assembly is used;

FIG. 5 is a side view with the anchor member in anchoring position of the embodiment of FIG. 4;

FIG. 6 is a plan view of a third embodiment of the present invention;

FIG. 7 shows a cross section of the FIG. 6 embodiment taken along line 7—7 and also showing an alternate form of fastener;

FIG. 8 is an end view taken along line 8—8 of FIG. 6;

FIG. 9 is a side view of a fourth embodiment of the anchor of the present invention; and, FIG. 10 is a plan view of the embodiment shown in FIG. 9.

DETAILED DESCRIPTION OF THE INVENTION

The fastener assembly of the present invention, shown generally at 10, comprises an anchor member 12 and a threaded fastener 14. Anchor member 12 has a plate-like structure 13 with a generally triangular point 16. The point 16 is thin enough to form a sharp edge which can be pushed or hammered into the wallboard. A longitudinally extending recess is formed by semicylindrical segments 18 and 20 which lie generally along the axis of the anchor 12 and project in opposite directions from the plane of the plate-like structure. This recess receives the threaded shank 22 of fastener 14 and, as shown in FIG. 2, the upper segment 18 may be provided with grooves 24 which engage the threads of the fastener. Further, an aperture 26 which extends through the anchor member 12 is formed by edges 28 and 30 of the semi-cylindrical segments 18 and 20, the edges also engaging the threads of the fastener for purposes to be set forth in detail herebelow. The end wall 31 of segment 18 has an opening slightly larger than the root diameter of the fastener (FIG. 3) and forms a third thread-engaging edge. A pair of camming ears 36 and 38 are formed on the end of anchor 12 opposite point 16.

Fastener 14 has a head 32 with a drive recess 34 therein. In operation, fastener 14 is assembled with anchor member 12 with the axis thereof extending in the same general direction as the axis of the anchor. The fastener assembly 10 is then pushed or driven by a hammer into the wallboard (not shown). When anchor member 12 has been driven through the wallboard completely, the fastener is rotated clockwise advancing it into the anchor by virtue of the thread engagement with grooves 24 and edges 28 and 30 of aperture 26. Camming ears 36 and 38 engage the back surface of the wallboard and cause the anchor to rotate clockwise (as shown in FIG. 1) to a position extending across the axis of the fastener. The shank of the fastener remains in contact with edges 28 and 30 and, in fact, the pivoting takes place about these two edges. The fastener now extends through aperture 26 in the same general direction as the aperture extends. Continued rotation of the fastener will seat the undersurface of head 32 against the bracket or other item being secured to the wallboard.

FIGS. 4 and 5 relate to an alternate embodiment of the invention. In this embodiment, the upper semi-cylindrical segment is slotted at 40, along a portion of its line of contact with plate-like structure 13. This forms a spring finger 42 which is bent inwardly slightly to give it its spring characteristics. One or more projection(s) 44 may be formed at the tip end of anchor 12. This projection 44 engages the threads of the tip fastener 14 and maintain the fastener and anchor in alignment against the pressure of spring finger 42. This embodiment also shows a plurality of penetrating barbs 48 and 50 formed at right angles to each other. These barbs will engage in the back surface of the wallboard and maintain it in position. If it becomes necessary to remove the fastener, to replace the mounting bracket for example, the barbs 48 and 50 will support the anchor in the wall so that the fastener 14 can be reinserted following replacement.

In operation, this embodiment is inserted through an appropriately shaped opening 52 in the mounting bracket (FIG. 4). Opening 52 is large enough to receive semi-cylindrical segments 18 and 20 and has upper and lower slots of sufficient width to pass the flanges of the plate 13 including barbs 48 and 50. However, opening 52 is insufficient to pass the head 32 of the fastener. The fastener assembly is inserted in opening 52 and driven partially through the wallboard. Then, fastener 14 is backed out of anchor 12 one or two turns, just far enough for the tip of the fastener to clear projection 44. The fastener 14 and anchor 12 are retained in axial alignment by the wallboard. Percussive driving of the assembly continues until the trailing end of the anchor clears the wallboard. At that time, spring finger 42 causes anchor to rotate across the axis of fastener 14 and assume the configuration shown in FIG. 5. Now, again the fastener may be threaded into the aperture 26 in the anchor. The spring finger 42 will also be drawn upwardly tending to lock the fastener in place. Even though spring finger 42 replaces the function of camming ears 36 and 38, it is preferred that they be retained in the event there is any tendency for the anchor to bind.

FIGS. 6–8 show yet a third embodiment. This embodiment is similar to that of FIGS. 4 and 5 in that projection 44 captures the tip of the screw and also transmits the hammering on the screw to the anchor 12 (rather than transmitting the force through the threads which might cause them to shear). In addition to spring finger 42, this embodiment adds a second spring finger 43 which engages the front end of the screw. The cooperation of spring fingers 42 and 43 pushing against opposite sides of fastener 12 will improve the camming of the anchor once it has cleared the wallboard.

Also depicted in conjunction with this embodiment are a pair of longitudinally extending ribs 52. These ribs will engage the backside of the drywall following camover and discourage the anchor 12 from rotating as the fastener is advanced into aperture 26. The alternate form of fastener shown here, which can, of course, be used with any of the embodiments, has a small head 32. This small headed fastener is used with a spring clamp 54 or the like to secure a bracket (not shown) to the wall. With this embodiment, the fastener assembly can be installed first and the bracket mounted afterward. This fastener 14 has a right-handed thread 56 on the upper end of the shank and a left-handed thread 58 on the lower end.

The end of spring finger 43 has two means to engage left-handed thread 58. The first is a pair of threads 60 pressed through the sheet metal so as to engage fastener thread 58. The other means comprises folding a corner 62 of the spring finger inwardly so as to conform to the radius of the tip of the fastener thereby increasing thread engagement. Of course, these means may be used together or separately and with any other of the depicted embodiments.

In operation, the fastener assembly of this embodiment is pushed or hammered into the wallboard, as previously, until the anchor clears the backside. Then, rotation of the fastener in a clockwise direction will cause the point of the fastener to be withdrawn from projection 44 due to the left-handed thread 58. Once the point has cleared the end of the projection, spring fingers 42 and 43 will cause the anchor to rotate in a clockwise direction (as shown in FIG. 7) disengaging the left-handed thread 58. Continued clockwise rotation of fastener 14 will cause right-handed thread 56 to advance the fastener into aperture 26 as in the previous embodiments.

A fourth configuration is shown in FIGS. 9 and 10. In this embodiment, the edges 28 and 30 of aperture 26 are bent inwardly toward the axis of the anchor and angled across the anchor at the same angle as the threads on the fastener. This greatly improves the amount of thread engagement for both axial and transverse driving of the fastener.

As will be apparent from the foregoing disclosure, the fastener assembly of the present invention can be used with a wide variety of wallboard thicknesses. Further, it will be appreciated that unlike expanding anchors, the current invention is uneffected by obstructions. The anchor assembly will embed in a wooden stud as easily as a nail and will anchor more firmly.

Various changes, modifications and variations will suggest themselves to a person of ordinary skill in the art in view of the foregoing disclosure. For example, in addition to the point configurations depicted, the leading edge might be rounded, sharpened, or toothed without adversely affecting performance. Accordingly, it is intended that the invention incorporate all such changes, modifications and variations as come within the scope of the appended claims.

We claim:

1. A fastener assembly for attaching articles to wallboard said assembly comprising a self-penetrating anchor member capable of being pushed or driven through said wallboard said anchor having a first length and a headed, threaded fastener having a second greater length; said anchor member including a plate-like structure with a penetrating point on the leading end thereof, a recess extending longitudinally of said anchor member which receives said fastener and is formed by a first semi-cylindrical segment projecting in one direction from the plane of the plate-like structure and having an inner face, said semi-cylindrical segment extending generally along the axis of said anchor member at one axial position thereof, said segment having first and second edges; and by a second semi-cylindrical segment projecting in the opposite direction from the plane of the plate-like structure having an inner face and also extending generally along the axis of said anchor member at a second axial position thereof, said second segment also having first and second edges; a projection for engaging the front of the fastener for transmitting an axial drive force applied to the head of the fastener to the anchor member, said projection sloping from a position generally in the plane of one of the semi-cylindrical segments to a position generally in the plane of the plate-like structure; an aperture extending through said plate between said semi-cylindrical segments of a size and figuration to receive said fastener said aperture being formed by the first edge of said first semi-cylindrical segment and by the second edge of said second semi-cylindrical segment; means for causing a pivotal rotation of said anchor member relative to the axis of said fastener from a position in which the two inner faces of the semi-cylindrical segments engage the threaded shank to a position in which the first and second aperture-forming-edges engage the threaded shank; whereby the fastener assembly can be pushed or percussively driven by means of the fastener head into the wallboard until the anchor member passes completely therethrough at which time the means for causing pivotal rotation of said anchor member relative to said fastener will cause the anchor to be reoriented to a position extending across the axis of the fastener and the fastener threadingly advanced through said aperture.

2. The fastener assembly of claim 1 including means for engaging the threads of the fastener comprising indentations on the inner surfaces of said semi-cylindrical segments.

3. The fastener assembly of claim 1 wherein the means for causing rotation of said anchor member comprises a pair of camming ears.

4. The fastener assembly of claim 1 wherein the means for causing rotation of said anchor member comprises a spring finger formed from a portion of said first semi-cylindrical segment.

5. The fastener assembly of claim 4 wherein the means for causing rotation of said anchor member further comprises a second spring finger formed from a portion of said second semi-cylindrical segment.

6. The fastener assembly of claim 1 further comprising means to retain the anchor member in engagement with the back of the wallboard.

7. The fastener assembly of claim 6 wherein the means to retain said anchor member in engagement with the back of the wallboard comprises a plurality of wall penetrating barbs.

8. The fastener assembly of claim 1 wherein the projection for engaging the front of the fastener is an extension of the second semi-cylindrical segment.

9. The fastener assembly of claim 1 wherein the projection for engaging the front of the fastener is on the same side of the plate-like member as said first semi-cylindrical segment.

10. A method of inserting a fastener assembly, which includes a plate-like, self-penetrating anchor member having a first length and a threaded fastener having a second greater length and which is in threaded engagement with the fastener and has a head with a drive recess therein, into wallboard comprising the steps of employing means retaining the anchor and fastener in axial alignment, partially percussively driving said assembly into the wallboard, backing the fastener out of said anchor one or two turns to disengage the retaining means, continuing the percussive driving of the assembly into the wallboard until the anchor member has passed completely therethrough, rotationally advancing said fastener into said anchor member until the head of the fastener is firmly seated.

* * * * *